United States Patent

Avent

[11] Patent Number: 5,379,543
[45] Date of Patent: Jan. 10, 1995

[54] FISHING LURE ASSEMBLY
[76] Inventor: John E. Avent, 311 Acorn St., Raleigh, N.C. 27604
[21] Appl. No.: 191,950
[22] Filed: Feb. 4, 1994
[51] Int. Cl.[6] ............................................ A01K 83/00
[52] U.S. Cl. .................................. 43/42.15; 43/42.09; 43/42.05; 43/42.36
[58] Field of Search .................. 43/42.11, 42.15, 42.18, 43/42.05, 42.13, 42.14, 42.16, 42.28, 42.34, 42.31, 42.36, 42.45, 42.48, 42.09

[56] References Cited

U.S. PATENT DOCUMENTS

| | | |
|---|---|---|
| 1,848,704 | 3/1932 | Farley . |
| 1,972,697 | 9/1934 | Walsh ...................................... 43/47 |
| 2,112,901 | 4/1938 | Anderson ................................. 43/46 |
| 2,317,781 | 4/1943 | Lehto . |
| 2,344,580 | 3/1944 | Wood . |
| 2,494,407 | 1/1950 | Rhodes ................................ 43/42.05 |
| 2,609,633 | 9/1952 | Cracker ............................... 43/52.05 |
| 2,616,206 | 11/1952 | Ammon . |
| 2,734,301 | 2/1956 | Fuqua . |
| 2,794,288 | 6/1957 | Marshall et al. .................. 43/42.11 |
| 3,740,891 | 6/1973 | Rubenstein . |
| 4,215,506 | 8/1980 | LeBoeuf . |
| 4,936,042 | 6/1990 | Causey . |

Primary Examiner—P. Austin Bradley
Assistant Examiner—James Miner
Attorney, Agent, or Firm—Olive & Olive

[57] ABSTRACT

A fishing lure assembly provides a primary surface type lure formed so as to be able to slide on the fishing line on which it is mounted and a secondary subsurface type lure secured to the end of the line. Various modifications permit the primary line to mount various fish attracting devices.

5 Claims, 2 Drawing Sheets

FISHING LURE ASSEMBLY

FIELD OF INVENTION

The invention relates to fishing lures and particularly to the type of fishing lure having a main line which extends through the body of a primary lure adapted to slide on the line and also relates to lure assemblies incorporating both a primary lure and a secondary lure.

BACKGROUND OF INVENTION

It has previously been known to provide fishing tackle having a lure and a main line that extends through the body of the lure and permits the lure to slide on the line under certain conditions. Examples of such lures are found in U.S. Pat. Nos. 1,972,697; 2,112,901; 2,494,407; 2,609,633 and 2,794,288, it has also been known to provide a fishing lure assembly having a primary lure and a secondary lure such as shown in U.S. Pat. No. 2,794,288. However, what has not been heretofore achieved and which becomes the object of the present invention is to provide a fishing lure assembly having a main line mounting a primary lure which can slide back and forth on the line, an associated secondary lure and a unique combination of features which permit the primary lure and associated secondary lure to (a) be easily cast together; (b) the primary lure to produce an intermittent or popping sound for attracting fish; (c) provide both a surface and a subsurface lure; and (d) utilize the primary lure in a manner such that it can be used as a strike indicator, alternatively as a depth control or in combination with a skirt solely as a surface or so-called top water lure.

SUMMARY OF INVENTION

The fishing lure assembly of the invention comprises a floatable plug simulating in shape and color a small bait size fish serving as a primary lure through which the main line extends in slidable relation substantially along the central longitudinal horizontal axis thereof. The primary lure transports a hook structure and is shaped at its forward end to produce an intermittent or popping sound when pulled through the water. The trailing end of the main line in the principal first embodiment mounts a secondary lure comprising a lightweight spoon at the outer end of which is mounted another hook structure. In a second embodiment, a bead and split ring are mounted on the trailing end of the line which permits mounting of a skirt as a secondary lure immediately behind the primary lure and in a third embodiment a propeller is mounted at the rear of the primary lure to accent fish attraction produced by the primary lure. The primary lure is thus versatile and is designed in such a way that it can be used with a variety of fish attracting devices such as the mentioned spoon, skirt or propeller.

DESCRIPTION OF PREFERRED EMBODIMENT

Figure 5:
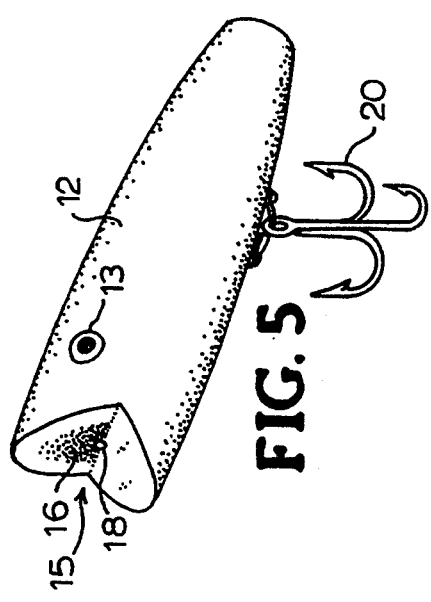
FIG. 5 is a perspective view of the plug of FIG. 2.
Figure 9:
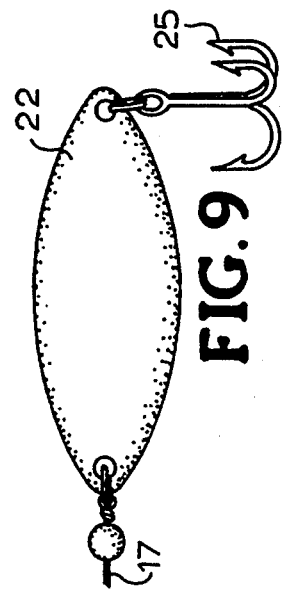
FIG. 9 is a side elevation view of a spoon as used in the invention.

Making reference initially to FIGS. 1-5, the fishing lure assembly 10 of the invention provides a primary lure simulating a small, suitably colored fish approximating the size of the typical minnow used for bait comprising a plug 12 made of a floatable wood, plastic or other material having a simulated open mouth with jaws 15 formed with a recessed, relatively shallow, cavity 16 which has been discovered to produce a desirable, fish attracting, intermittent or popping sound in use. Plug 12 has a relatively smooth, rearwardly tapered shape devoid of fins or the like, is of a solid construction, and cross-sections at any location along the length of the plug are generally circular and centered on the central longitudinal, horizontal axis of the plug.

Simulated fish eyes 13 are mounted on an upper surface of the plug immediately behind the upper of the jaws. The main line 17 leading from the rod-reel assembly 19 held by the fisherman F passes through a central opening or bore 18 substantially coinciding with the central longitudinal horizontal axis of lure 12. A set of hooks 20 are fitted outwardly and beneath plug 12 intermediate the length thereof. A conventional concave, lightweight metal formed spoon 22 forms a secondary lure and is secured to the outer end of the main line 17. Another hook structure 25 is loosely mounted on the outer or trailing end of spoon 22. Thus, after the line assembly 10 has been cast, there is provided both a surface and a subsurface lure and an intermittent or popping sound is produced as plug 12 is pulled through the water.

Prior to casting, the lures are assembled as illustrated and the fisherman F brings the primary lure or plug 12 in close relation with the secondary lure or spoon 22 such that they may be cast together. After the initial cast, the spoon 22 tends to sink as in FIG. 1 and thus there is quickly established both a surface lure provided by plug 12 and a subsurface lure provided by spoon 22.

Figure 7:
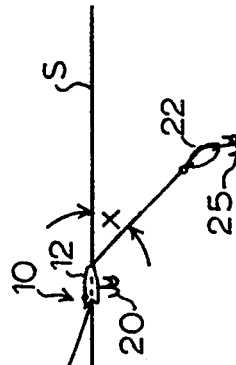
FIG. 7 indicates the lure assembly of FIG. 1 in use and with the plug serving as a strike indicator.
Figure 7:
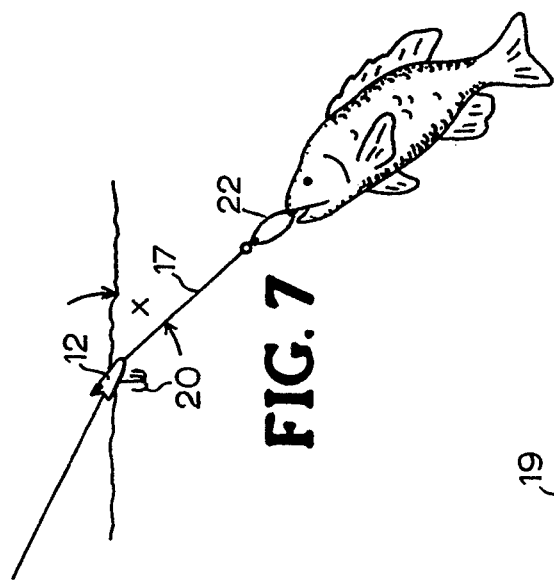
Figure 1:
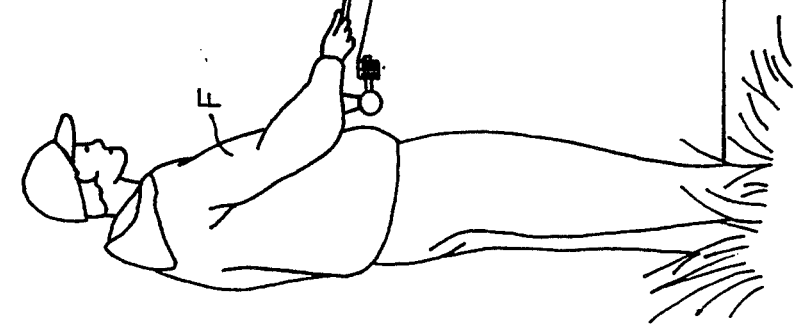
FIG. 1 illustrates a first embodiment of the invention in use illustrating how the spoon, i.e. the secondary lure, tends to sink relative to the surface plug, i.e. the primary lure after the lures have been cast.
Figure 3:
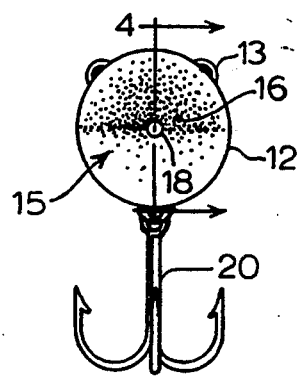
FIG. 3 illustrates a front end view of the plug of FIG. 2.

In use, the lure 12 floats and when a fish is caught by the secondary lure immediately tilts and thus acts as a strike detector as seen in FIG. 7. After being cast, the line 17 to which the spoon 22 is attached, tends to assume a roughly 45° angle X with respect to the water surface S.

Figure 2:
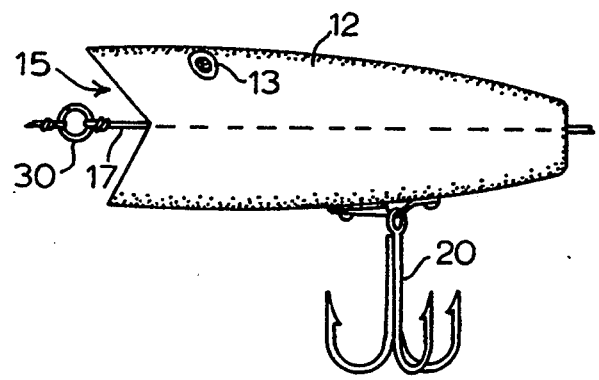
FIG. 2 illustrates a side view of the plug which serves as the primary lure and showing the main line fitted with a split ring to act as a stop.
Figure 4:
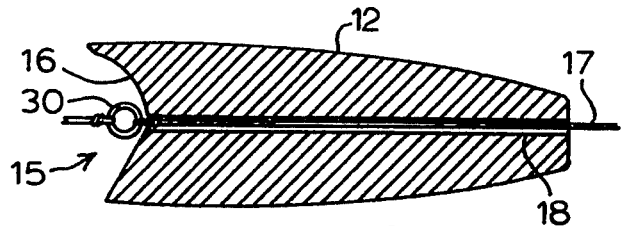
FIG. 4 illustrates a cross section taken along line 4—4 of FIG. 3
Figure 6:
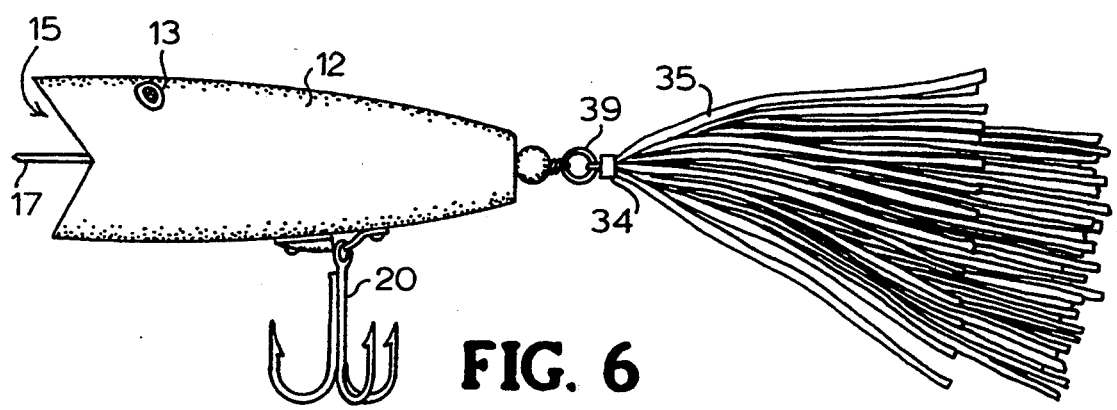
FIG. 6 illustrates the plug of FIG. 2 fitted with a bead and split ring and skirt.
Figure 8:
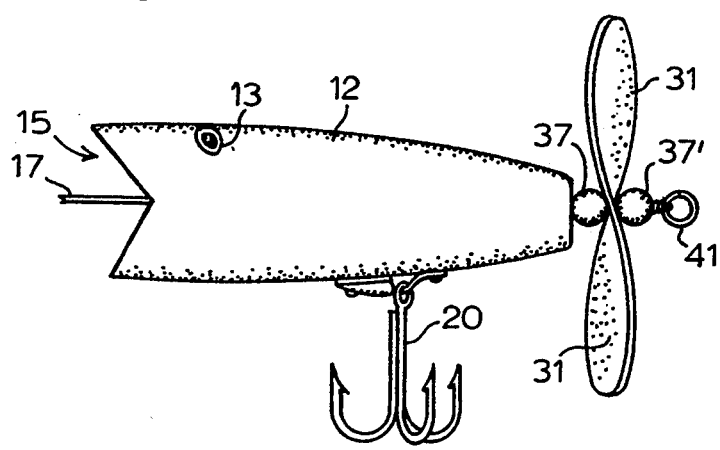
FIG. 8 illustrates the plug of FIG. 2 fitted with a propeller.

Depth control can be achieved by installing a stop 30 on the main line 17 as in FIG. 2. The flexible hub portion 34 of a conventional rubber or plastic formed skirt 35 can be installed over a bead, not shown and hidden from view in FIG. 6, and split ring 39 as in FIG. 6. Further versatility is exhibited by the ability to use plug 12 with a propeller 31 mounted between a pair of beads 37, 37' and secured by a split ring 41. Propeller 31 revolves when plug 12 is pulled through the water and in conjunction with the sound produced by plug 12, further attracts the fish being sought.

In summary, the following advantages are achieved in conjunction with providing the intermittent or popping sound:

(a) A secondary lure of any normal weight used in fishing can be delivered at any of any infinite number of depths.

(b) The primary lure can serve as a strike indicator for the secondary lure.

(c) The primary lure does not restrict the ability to set the hook on the secondary lure.

(d) The primary lure acts as an attraction to the secondary lure.

(e) Each cast presents two entirely different lures to the fish at the same time.

(f) Fish searching is enhanced by the presence of both a primary and a secondary lure.

(g) In a schooling fish situation, the opportunity for catching two fish simultaneously is enhanced.

What is claimed is:

1. A fishing lure assembly for use with a fishing line and means for casting the line, comprising:
   (a) a primary lure having:
      (i) a floatable, rearwardly tapering, fish colored, smooth surfaced, solid body portion extending lengthwise between leading and trailing ends;
      (ii) said leading end formed to simulate the open jaws of a fish and said trailing end terminating in an end surface which is free of any associated lure attachment;
      (iii) a pair of simulated fish eyes mounted on an upper portion of said body portion rearward of an upper of said jaws;
      (iv) within a selected inner portion of said jaws, a cavity portion formed so as to create an intermittent sound when said body portion is pulled through water;
      (v) cross sections of said body portion formed generally of cylindrical shape and of varying diameter between said leading and trailing ends and having a central horizontally disposed longitudinal axis extending between said ends and centrally through said cylindrical cross sections;
      (vi) a horizontal cylindrical bore of uniform diameter formed coaxial with said axis and extending between a front opening to said bore located centrally of said leading end and a rear opening to said bore located on said end surface centrally of said body portion at said trailing end; and
      (vii) a first hook structure loosely supported on a bottom surface of said body portion at a location intermediate said leading and trailing ends;
   (b) a fishing line having a continuous first portion including a portion passing loosely through said bore and totally but loosely confined within said body portion between said leading and trailing ends;
   (c) a submersible secondary lure attached to an outer end of a second portion of said line forming an extension of said first portion, said secondary lure being freely movable rearwardly and downwardly from a casting position adjacent and posterior to the said trailing end of said primary lure body portion thereby enabling said primary lure to serve as a surface lure and said secondary lure as a subsurface lure;
   (d) a second hook structure loosely secured to said secondary lure; and
   (e) means associated with said secondary lure for attracting fish.

2. A fishing lure assembly as claimed in claim 1 wherein said secondary lure and said means associated with said secondary lure comprise a spoon and including said second hook structure loosely attached to a trailing end of said spoon.

3. A fishing lure assembly as claimed in claim 1 wherein said secondary lure and said means associated with said secondary lure comprise a skirt.

4. A fishing lure assembly as claimed in claim 1 wherein said line includes stop means located on said line forward of said body portion leading end and operable to limit the extent to which said line can be drawn through said bore.

5. A fishing lure assembly for use with a fishing line and means for casting the line, comprising;
   (a) a primary lure having:
      (i) a floatable rearwardly tapered body portion extending lengthwise between leading and trailing ends;
      (ii) said leading end formed to simulate the open jaws of a fish and said trailing end terminating in an end surface which is free of any associated lure attachment;
      (iii) cross sections of said body portion formed generally of cylindrical shape and of varying diameter between said leading and trailing ends and having a central horizontally disposed longitudinal axis extending between said ends and centrally through said cylindrical cross sections;
      (iv) a horizontal cylindrical bore of uniform diameter formed coaxial with said axis arid extending between a front opening to said bore located centrally of said jaws at said leading end and a rear opening to said bore located centrally of said body portion at said trailing end; and
      (v) a first hook structure loosely supported on a bottom surface of said body portion at a location intermediate said leading and trailing ends;
   (b) a fishing line having a continuous first portion including a portion passing loosely through said bore and totally but loosely confined within said body portion between said leading and trailing ends; and
   (c) a submersible secondary lure comprising a spoon having one leading end attached to an outer end of a second portion of said line forming extension of said first portion and an opposite trailing end loosely secured to a second hook structure, said secondary lure independent of being pulled by a fish strike being movable rearwardly and downwardly from a casting position adjacent and posterior to the said trailing end of said primarily lure body portion, said primary lure thereby serving as a surface lure and said secondary lure as a subsurface lure.

* * * * *

UNITED STATES PATENT AND TRADEMARK OFFICE
CERTIFICATE OF CORRECTION

PATENT NO. : 5,379,543
DATED : January 10, 1995
INVENTOR(S) : John E. Avent

It is certified that error appears in the above-indentified patent and that said Letters Patent is hereby corrected as shown below:

Column 4, line 38, correct "arid" to read --and--.

Column 4, line 53, insert --an-- after "forming".

Signed and Sealed this

Seventh Day of March, 1995

Attest:

BRUCE LEHMAN

*Attesting Officer*     *Commissioner of Patents and Trademarks*